(12) United States Patent
Shima

(10) Patent No.: US 7,537,407 B2
(45) Date of Patent: May 26, 2009

(54) BALL JOINT

(75) Inventor: Kotaro Shima, Nishikamo-gun (JP)

(73) Assignee: Toyota Jidosha Kabuhsiki Kaisha, Toyota (JP)

( * ) Notice: Subject to any disclaimer, the term of this patent is extended or adjusted under 35 U.S.C. 154(b) by 212 days.

(21) Appl. No.: 10/582,669

(22) PCT Filed: Sep. 7, 2005

(86) PCT No.: PCT/JP2005/016869

§ 371 (c)(1),
(2), (4) Date: Jun. 12, 2006

(87) PCT Pub. No.: WO2006/028256

PCT Pub. Date: Mar. 16, 2006

(65) Prior Publication Data

US 2008/0089738 A1    Apr. 17, 2008

(30) Foreign Application Priority Data

Sep. 8, 2004    (JP) .............................. 2004-261203

(51) Int. Cl.
*F16C 11/00* (2006.01)
(52) U.S. Cl. ..................... 403/135; 403/141; 403/142
(58) Field of Classification Search .................. 403/56, 403/76, 90, 114, 115, 122–144
See application file for complete search history.

(56) References Cited

U.S. PATENT DOCUMENTS

| | | | |
|---|---|---|---|
| 3,524,664 A * | 8/1970 | Scheublein, Jr. et al. | .... 403/140 |
| 3,602,560 A | 8/1971 | Memmel | |
| 4,318,627 A | 3/1982 | Morin | |
| 4,324,501 A | 4/1982 | Herbenar | |
| 4,690,581 A * | 9/1987 | Umemoto et al. | ........... 403/133 |
| 6,302,615 B1 | 10/2001 | Kleiner et al. | |
| 2003/0180089 A1 | 9/2003 | Heuser et al. | |

FOREIGN PATENT DOCUMENTS

| | | |
|---|---|---|
| DE | 197 56 756 C1 | 7/1999 |
| JP | A 9-502250 | 3/1997 |
| JP | A 11-182530 | 7/1999 |
| JP | A 11-247838 | 9/1999 |
| JP | A 2000-291625 | 10/2000 |
| JP | A 2002-221218 | 8/2002 |

* cited by examiner

*Primary Examiner*—Victor MacArthur
(74) *Attorney, Agent, or Firm*—Oliff & Berridge, PLC

(57) ABSTRACT

In a ball joint 10, when a ball stud 11 rotates about its center axis L, at the beginning of the rotation, a ball seat 12 can be elastically deformed in the rotational direction, whereby the rotational torque can be gradually increased as the rotational angle increases. In a region of the ball seat 12 where slits S are provided, the frictional engagement force between a spherical head portion 11a of the ball stud 11 and the ball seat 12 is made greater than the frictional engagement force between the ball seat 12 and the ball socket 13. Therefore, when the ball stud 11 rotates about its center axis L, the ball seat 12 elastically deforms in the rotational direction before the spherical head portion 11a starts to slip in relation to the ball seat 12 in the region where a lager fiction engagement force is generated.

1 Claim, 2 Drawing Sheets

BALL JOINT

TECHNICAL FIELD

The present invention relates to a ball joint, and more particularly to a ball joint suitably used as a joint of a suspension system for a vehicle.

BACKGROUND ART

There has been known a ball joint which includes a ball stud having a spherical head portion and a shaft portion, and a socket coupled with the spherical head portion of the ball stud via a ball seat, and in which the ball stud can turn in relation to the socket about the spherical center of the spherical head portion. Such a ball joint is shown in, for example, Japanese Patent Application Laid-Open (kokai) No. H11-182530.

In the ball joint disclosed in the publication, the ball seat is secured to the socket, and the spherical head portion of the ball stud is slidably supported by a spherical surface formed on the ball seat. In this ball joint, if frictional engagement force produced between the spherical head portion of the ball stud and the ball seat is set high, when the ball stud rotates about its center axis, its rotational angle (deg) and rotational torque (Nm) have a relation as indicated by characteristic line a in FIG. 4. If the frictional engagement force between the spherical head portion of the ball stud and the ball seat is set low, the relation changes as indicated by characteristic line b in FIG. 4.

Incidentally, the frictional engagement force between the spherical head portion of the ball stud and the ball seat can be changed by varying the material (friction coefficient) of the ball seat, the engagement force (surface pressure) between the spherical head portion of the ball stud and the ball seat, grease interposed between the spherical head portion of the ball stud and the ball seat, and the like. However, in any case, the ball stud does not rotate in relation to the ball seat and the socket until the rotational torque reaches a set value (e.g., Ta, Tb in FIG. 4). Therefore, in the case where such a ball joint is applied to a portion which constitutes a kingpin of a steerable wheel in a suspension system for a vehicle, satisfactory steering feeling may fail to be attained, because the ball stud does not rotate until the rotational torque reaches a set value (e.g., Ta, Tb in FIG. 4).

DISCLOSURE OF THE INVENTION

The present invention was accomplished so as to solve the above-described problems, and provides a ball joint comprising a ball stud having a spherical head portion and a shaft portion, and a socket coupled with the spherical head portion of the ball stud via a ball seat, wherein the ball stud can turn in relation to the socket about the spherical center of the spherical head portion. The ball joint further comprises elastic deformation allowing means for allowing the ball seat to elastically deform in the rotational direction about the center axis of the shaft portion. In a region corresponding to the elastic deformation allowing means, frictional engagement force generated between the spherical head portion and the ball seat is made greater than that between the ball seat and the socket, whereby when the ball stud rotates about the center axis, the ball seat elastically deforms in the rotational direction before the spherical head portion starts sliding in relation to the ball seat in the region where a larger frictional engagement force is generated. In this case, the elastic deformation allowing means may be a plurality of slits formed in the ball seat.

In this ball joint, when the ball stud rotates about the center axis thereof, the ball seat can be elastically deformed in the rotational direction at the beginning of rotation; i.e., before the spherical head portion starts sliding in relation to the ball seat in the region where a larger frictional engagement force is generated. Therefore, the rotational torque can be gradually increased with the rotational angle, whereby proper rotational torque can be generated in accordance with the rotational angle.

Therefore, in the case where the above ball joint is applied to a portion which constitutes a kingpin of a steerable wheel in a suspension system for a vehicle, the steering torque (rotational torque) can be gradually increased with the steering angle (rotational angle of the ball stud) at start of a steering operation (at the beginning of rotation of the ball stud), to thereby improve the steering feeling.

When the present invention is embodied, the ball seat may be constituted by materials having large and small friction coefficients, respectively. In the region where elastic deformation in the rotational direction is permitted by means of the elastic deformation allowing means, a material of large friction coefficient is partially provided at a portion which comes into engagement with the spherical head portion, and a material of small friction coefficient is provided at a portion which comes into engagement with the socket. In the region where elastic deformation in the rotational direction is not permitted by means of the elastic deformation allowing means, the material of large friction coefficient is provided at a portion which comes into engagement with the socket, and the material of small friction coefficient is provided at a portion which comes into engagement with the spherical head portion.

In this case, since the ball seat can be formed by materials having large and small friction coefficients, the ball joint can be manufactured at low cost, and the rotational angle vs. rotational torque characteristic of the ball joint can be readily set and changed through selective setting of the friction coefficients of the materials of the ball seat.

BEST MODE FOR CARRYING OUT THE INVENTION

Figure 1:
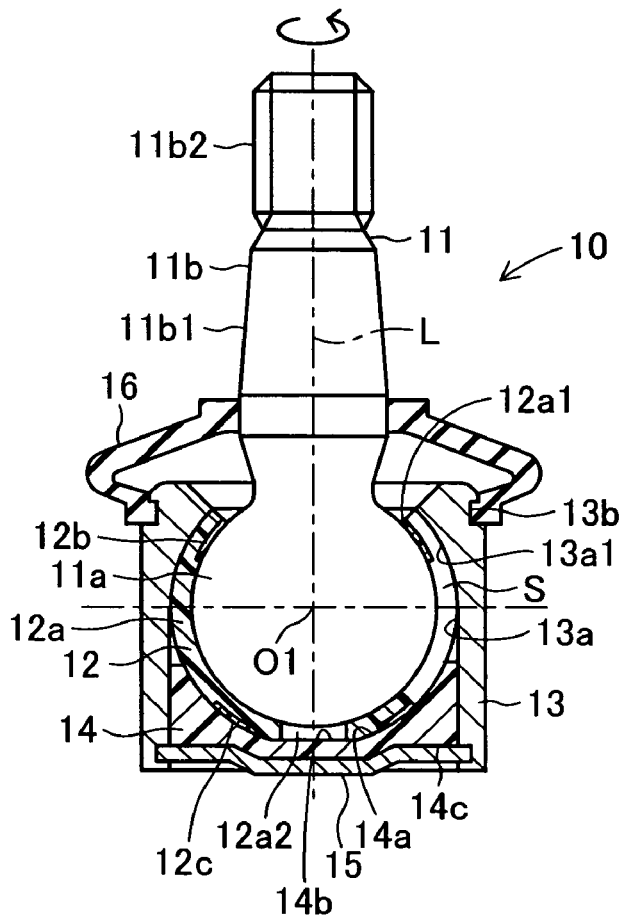
FIG. 1 is a vertically sectioned front view showing an embodiment of a ball joint according to the present invention.

An embodiment of the present invention will now be described with reference to the drawings. FIG. 1 shows a ball joint according to the present invention. The ball joint 10 of the embodiment includes a ball stud 11, a ball seat 12, a socket 13, a seat 14, a cap 15, and a dust cover 16.

The ball stud 11 has a spherical head portion 11a and a shaft portion 11b, and is coupled, at the spherical head portion 11a, with the socket 13 via the ball seat 12. Thus, the ball stud 11 can rotate in relation to the socket 13 about the spherical center O1 of the spherical head portion 11a. The ball stud 11 is formed of a metal, and a taper portion 11b1 and an external thread portion 11b2 are formed on the shaft portion 11b. The ball stud 11 is coupled, at the shaft portion 11b, with a knuckle (or control arm) of a suspension system for a vehicle.

Figure 2:
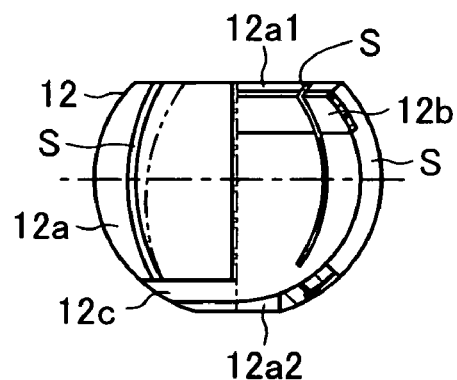
FIG. 2 is a front view of the ball seat shown in FIG. 1, with its right half vertically sectioned.

The ball seat 12 is previously assembled to the spherical head portion 11a of the ball stud 11 before the ball stud 11 is assembled to the socket 13, and is assembled to the socket 13 in a state where the ball seat 12 is integrated with the ball stud 11. As shown in FIGS. 1 and 2, the ball seat 12 is composed of a resin element 12a having a small friction coefficient and assuming the form of a hollow sphere, and resin elements 12b and 12c each having a large friction coefficient and assuming the form of a band. Eight slits S are formed in the resin elements 12a and 12b.

The hollow, spherical resin element 12a has an opening 12a1 at one end (upper end in FIG. 1), and a through hole 12a2 at its other end for accumulating grease (not shown). The outer circumference of the resin element 12a is in slidable engagement with a spherical surface 13a1 of the socket 13 on the side toward the opening 12a1, and is in slidable engagement with a spherical surface 14a of the seat 14 on the side toward the through hole 12a2. The inner circumference of the resin element 12a, excluding a portion where the band-shaped resin element 12b is disposed, is in slidable engagement with a spherical surface of the spherical head portion 11a. Therefore, the resin element 12a is allowed to rotate about the center axis L of the shaft portion 11b of the ball stud 11.

The band-shaped resin element 12b is fixed to the inner circumference of the resin element 12a on the side toward the opening 12a1. The inner circumference of the resin element 12b is in slidable engagement with the outer circumference of a base end portion (upper end portion in FIG. 1) of the spherical head portion 11a of the ball stud 11. Meanwhile, the band-shaped resin element 12c, which is formed of the same material as the band-shaped resin element 12b, is fixed to the outer circumference of the resin element 12a on the side toward the through hole 12a2. The outer circumference of the resin element 12c is in slidable engagement with the spherical surface 14a of the seat 14.

The slits S serve as elastic deformation allowing means for allowing the ball seat 12 to expand the opening 12a1 when the ball stud 11 and the ball seat 12 are coupled with each other. Further, in the assembled state shown in FIG. 1, the slits S serve as elastic deformation allowing means for allowing elastic deformation in the rotational direction about the center axis L of the shaft portion 11b of the ball stud 11 (see an imaginary line in FIG. 2). The slits S are provided at uniform intervals in the circumferential direction of the opening 12a1.

The socket 13 is formed of a metal, and has a shaft hole 13a for receiving the ball seat 12 and the seat 14, and an annular groove 13b. The spherical surface 13a1 is formed at one end of the shaft hole 13a, and is in slidable engagement with the outer circumference of an opening 12a1 side end portion (upper end portion in FIG. 1) of the ball seat 12. Moreover, an arm portion (not shown) extending in the radial direction of the shaft hole 13a is formed integrally with the socket 13. The socket 13 is coupled with the control arm (or knuckle) of the vehicle suspension system via the arm portion.

The seat 14 is formed of a resin material, and is assembled to the shaft hole 13a of the socket 13 to be interposed between the ball seat 12 and the cap 15. The above-described spherical surface 14a is formed on at one end portion of the seat 14, and a support surface 14b, which engages and supports a through-hole 12a2 side end portion of the ball seat 12, is also formed on the end portion. Moreover, an engagement surface 14c, which engages and is supported by one side of the cap 15, is formed on the other end portion of the seat 14.

The cap 15, which is formed from a metal plate, is fitted into the end of the shaft hole 13a of the socket 13 via an outer circumferential portion thereof, and fixed to the socket 13 through crimping an end portion of the socket 13. Thus, the cap 15 serves to position the ball stud 11, the ball seat 12, and the seat 14 in relation to the socket 13 and prevents these elements from coming off.

The dust cover 16 is formed of a rubber material, and has elasticity, so that it can deform upon turning (rotation and swinging) of the ball stud 11 about the spherical center O1. The dust cover 16 is fixed, at its one end, to the outer circumference of an intermediate portion of the ball stud 11, and is fixedly fitted, at its other end, to the annular groove 13b of the socket 13. Therefore, the dust cover 16 prevents entry of dust and/or water into the sliding portion inside the socket 13, and prevents grease charged into the socket 13 from flowing to the outside.

In the ball joint 10 of the present embodiment having the above-described structure, in a region (an upper end portion of the ball seat 12 in FIG. 1) where elastic deformation in the rotational direction is permitted by the slits S in the neutral state; i.e., a state in which the center axis L of the ball stud 11 generally coincides with the center of the shaft hole 13a of the socket 13, the resin element 12b, which has a large friction coefficient, is partially provided at a portion which comes into engagement with the spherical head portion 11a of the ball stud 11, and the resin element 12a, which has a small friction coefficient, is provided at a portion which comes into engagement with the socket 13. Therefore, the frictional engagement force between the spherical head portion 11a of the ball stud 11 and the resin element 12b of the ball seat 12 is greater than that between the ball seat 12 and the socket 13.

In a region (a lower end portion of the ball seat 12 in FIG. 1) where the slits S are not provided, the resin element 12c, which has a large friction coefficient, is provided at a portion which comes into engagement with the seat 14, and the resin element 12a, which has a small friction coefficient, is provided at a portion which comes into engagement with the spherical head portion 11a of the ball stud 11. Therefore, the frictional engagement force between the spherical head portion 11a of the ball stud 11 and the ball seat 12 is smaller than that between the resin element 12c of the ball seat 12 and the seat 14.

Moreover, the frictional engagement force between the resin element 12c of the ball seat 12 and the seat 14 is made greater than that between the spherical head portion 11a of the ball stud 11 and the resin element 12b of the ball seat 12. Therefore, the resin element 12c of the ball seat 12 does not start to slide in relation to the seat 14 before the spherical head portion 11a of the ball stud 11 starts to slide in relation to the resin element 12b of the ball seat 12.

Accordingly, when the ball stud 11 rotates about the center axis L, at the portion where the spherical head portion 11a is in engagement with the resin element 12b, which has a large friction coefficient; i.e., at a portion of large frictional engagement force, the resin element 12a of the ball seat 12 elastically deforms in the rotational direction as indicated by the imaginary line in FIG. 2 at the beginning of rotation; i.e., before the spherical head portion 11a of the ball stud 11 starts to slide in relation to the resin element 12b of the ball seat 12.

As a result, in the ball joint 10 of the present embodiment, when the ball stud 11 rotates about the center axis L, at the portion where the spherical head portion 11a is in engagement with the resin element 12b, which has a large friction coefficient; i.e., at a portion of large frictional engagement force, the resin element 12a of the ball seat 12 can be elastically deformed in the rotational direction at the beginning of rotation; i.e., before the spherical head portion 11a starts to slide in relation to the resin element 12b of the ball seat 12. Thus, as indicated by characteristic line A in FIG. 3, the rotational torque can be gradually increased, with gradient θ, as rotational angle increases.

Therefore, the ball joint 10 of the present embodiment can gradually increase the steering torque (rotational torque) with the steering angle (rotational angle of the ball stud 11) at start of a steering operation (at the beginning of rotation of the ball stud 11), to thereby improve the steering feeling.

Figure 3:
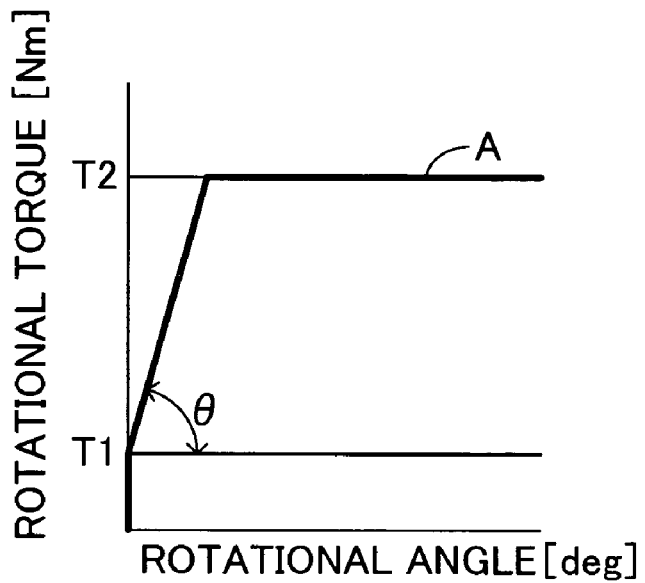
FIG. 3 is a graph showing the relation between rotational angle and rotational torque obtained by the ball joint shown in FIG. 1.
Figure 4:
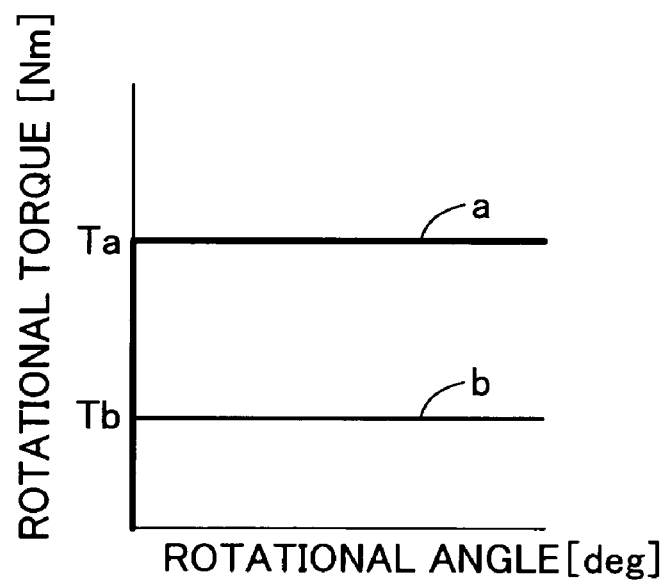
FIG. 4 is a graph showing the relation between rotational angle and rotational torque obtained by a conventional ball joint.

The point in time when the rotational torque starts to increase with gradient θ in FIG. 3 coincides with the point in time when sliding starts between the resin element 12a of the ball seat 12 and the socket 13 (when the rotational torque coincides with a set value T1). Further, the point in time when the rotational torque stops its increase with gradient θ in FIG. 3 coincides with the point in time when sliding starts between the spherical head portion 11a of the ball stud 11 and the resin element 12b of the ball seat 12 (when the rotational torque coincides with a set value T2 (T2>T1)).

In the ball joint 10 of the present embodiment, the ball seat 12 is composed of the resin element 12a of small friction coefficient and the resin elements 12b and 12c each of large friction coefficient. Therefore, the ball seat 12 can be formed at low cost, and thus, the ball joint 10 can be manufactured at low cost. In addition, the rotational angle vs. rotational torque characteristic of the ball joint 10 can be readily set and changed through selective setting of the friction coefficients of the resin elements 12a, 12b, and 12c, which are used to form the ball seat 12.

In the above-described embodiment, the friction coefficient of the resin element 12a of the ball seat 12 is made small, and the friction coefficients of the resin elements 12b and 12c of the ball seat 12 are made large. Thus, in the region where the slits S are provided, the frictional engagement force between the spherical head portion 11a of the ball stud 11 and the resin element 12b of the ball seat 12 becomes greater than that between the resin element 12a of the ball seat 12 and the socket 13; and in the region where the slits S are not provided, the frictional engagement force between the spherical head portion 11a of the ball stud 11 and the resin element 12a of the ball seat 12 becomes smaller than that between the resin element 12c of the ball seat 12 and the seat 14. However, generation of different frictional engagement forces as described above may be performed by changing the friction coefficients of the materials of the socket (13) and the seat (14), or by a method other than changing the friction coefficients; for example, by making the shapes of the respective engagement portions different from each other.

In the above-described embodiment, the ball seat 12 is constituted by the hollow, spherical resin element 12a of small friction coefficient, and the band-shaped resin elements 12b and 12c of large friction coefficient, and the slits S are formed in the spherical resin element 12a and the band-shaped resin element 12b of the ball seat 12. However, in place of the spherical resin element 12a of the ball seat 12, for example, paired upper and lower hollow hemispherical resin elements of small friction coefficient may be employed, in which slits are provided in the mutually butting end portions of the hollow hemispherical resin elements (in an intermediate portion of the ball joint).

In this case, a resin element having a large friction coefficient and assuming the shape of a band is provided on the inner circumference of the butting end portion of each hollow hemispherical resin element; a resin element having a large friction coefficient and assuming the shape of a band is provided on the outer circumference of the upper end portion of the upper hollow hemispherical resin element; and a resin element having a large friction coefficient and assuming the shape of a band is provided on the outer circumference of the lower end portion of the lower hollow hemispherical resin element. Notably, in this case, different frictional engagement forces can be generated by changing the friction coefficients of the materials of the socket (13) and the seat (14) instead of changing the friction coefficients of the materials of the ball seat (12) in the above-described manner.

In the above-described embodiment, the ball seat 12 is constituted by the hollow, spherical resin element 12a of small friction coefficient, and the band-shaped resin elements 12b and 12c of large friction coefficient (i.e., the entire ball seat is formed of resin). However, the material and shape of the ball seat may be freely determined. For example, the material of the ball seat (12) may be formed through use of a combination of resin and friction material, resin and metal, or metal and friction material, and is not limited to the above-described embodiment. Notably, such selection and setting of the material and shape can also be performed for the socket (13) and the seat (14).

The invention claimed is:

1. A ball joint comprising:
a ball stud having a spherical head portion and a shaft portion;
a socket receiving the spherical head portion therein; and
a ball seat having a hollow spherical resin element, a first annular resin element, and a second annular resin element, and a plurality of slits formed through the spherical resin element and the first annular resin element;
the spherical resin element being disposed between the socket and the head portion and having a top end with an opening receiving the ball stud therethrough and a bottom end supporting a bottom of the head portion, the spherical resin element allowing the ball stud to turn in relation to the socket about the spherical center of the head portion;
the first annular resin element being disposed in the top end of the spherical resin element between the spherical resin element and the spherical head portion;
the second annular resin element being disposed in the bottom end of the spherical resin element between the spherical resin element and the socket;
the first and second annular resin elements having a higher coefficient of friction than the spherical resin element such that rotation of the ball stud causes the spherical resin element to deform in a rotational direction about the center of the head portion before the spherical head portion starts sliding in relation to the annular resin elements.

* * * * *